Jan. 4, 1927.
C. V. BATES
1,612,902
RADIOCONDENSER
Filed April 16, 1925
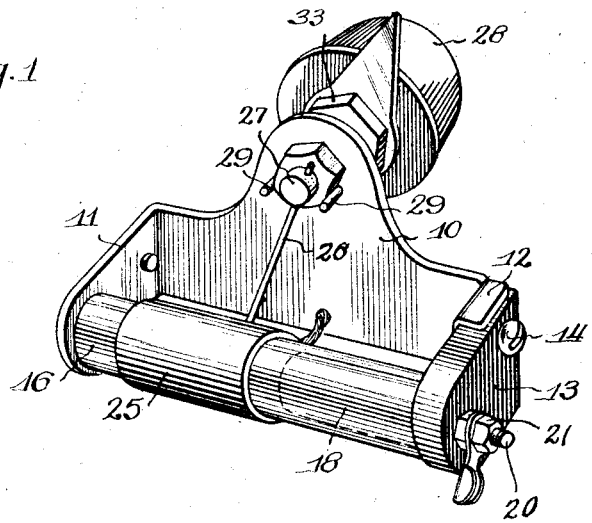
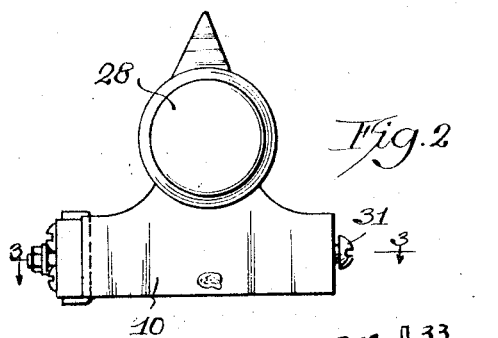
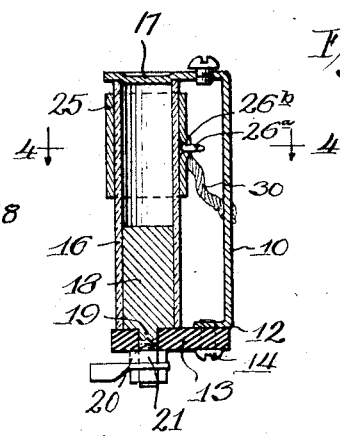
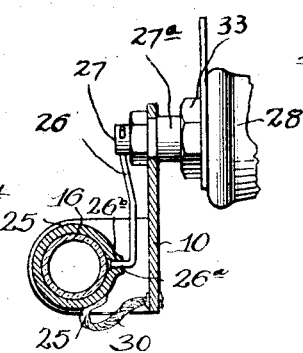
Witness:
Chas. R. Toursh
Inventor,
Clifford V. Bates
Offield Mahlhope Scott & Poole Attys.

Patented Jan. 4, 1927.

1,612,902

UNITED STATES PATENT OFFICE.

CLIFFORD V. BATES, OF CHICAGO, ILLINOIS, ASSIGNOR TO THE CINCH MANUFACTURING CORPORATION, OF CHICAGO, ILLINOIS, A CORPORATION OF ILLINOIS.

RADIOCONDENSER.

Application filed April 16, 1925. Serial No. 23,473.

This invention relates to improvements in radio condensers, and more particularly to manually adjustable condensers having relatively small capacity adapted for balancing or neutralizing radio circuits although not necessarily limited to such use.

The object of my invention is to provide a simple, durable and economical construction of the class of device above described The invention may best be understood by reference to the accompanying drawings, in which—

Figure 1 is a perspective view of the rear side of a condenser constructed in accordance with my invention.

Figure 2 is a front view of the condenser shown in Figure 1 but drawn to somewhat smaller scale.

Figure 3 is a horizontal sectional view taken on line 3, 3, of Figure 2.

Figure 4 is a cross section taken on line 4, 4, of Figure 3.

Referring now to details of my invention, I provide a supportive member or base plate 10 preferably of metal, having two rearwardly extending arms 11 and 12, the second mentioned arm being shorter than the first, but provided with an extension member 13 of suitable insulating material connected thereto by suitable means, such as a screw 14. The insulated member 13 is substantially the same length as the opposite arm 11, and the two are arranged to receive a cylindrical member 16 made of glass or similar material of high dielectric qualities. The cylinder is secured between the arm 11 and member 13 by suitable means, as, for example, in the form shown the arm 11 has an annular depressed portion 17 formed therein over which the adjacent end of the cylinder is fitted. A plug 18 of conducting metal is fitted closely in the opposite end of the cylinder and extends therein a part of the length thereof, depending upon the desired capacity of the condenser. This plug 18 is provided with a reduced terminal portion 19 having a threaded end 20 extending through the insulating member 13, and nuts 21, 21, fitted on the threaded portion 20 to secure the member 18 in place on the insulated member 13.

The movable or adjusting member of the condenser consists of a cylindrical sleeve 25 closely fitting on the outer face of the cylinder 16 and slidable therealong as clearly shown in Figs. 1 and 3. This sleeve is connected for adjustable movement therealong by suitable means, such as an arm 26, connected with a shaft 27 having bearing in a sleeve 27ª extending through the plate 10. The shaft 27 is controllable by a knob 28 in the usual manner. The lower end of the arm 26 may be connected to the sleeve 25 in any suitable manner as, for instance, by an inwardly extending tip 26ª fitting in a hole 26ᵇ formed in said sleeve. A pair of stop members 29, 29 are preferably mounted on the base plate 10 to limit the movement of the arm 26 within the desired range of movement of the sleeve 25 on the cylinder 16. Said sleeve may be connected in circuits in any desired manner, in the form shown herein, connection consisting of a flexible conductor 30 soldered or otherwise secured to the movable sleeve and having its other end connected to the metallic base 10, having a terminal screw 31 or similar device thereon. The entire condenser may be mounted in any desired manner, as for instance, the form shown is adapted for mounting directly to a radio panel by extending the shaft 27 and the threaded sleeve 27ª through a single hole in the panel and securing the same thereto by means of a threaded nut 33.

The use and operation of the condenser above described will be readily understood by those skilled in the art. The maximum capacity of the condenser may be regulated by changing the lengths of the co-operating capacity members 25 and 18 and also by increasing or diminishing the thickness of the dielectric cylinder 16 spacing the two condenser members apart. The entire construction is extremely simple and economical in manufacture and assembly, capable of giving a relatively wide variation in capacity values with an extremely low minimum, and the capacity varying directly with the relative position of the co-operating parts 25 and 18.

I claim as my invention:

1. In a condenser, a holding member, a cylindrical dielectric piece, a conductive piece mounted inside and at one end of said cylindrical member, and another conductive piece comprising a sleeve slidable longitudinally along the outside of said dielectric piece and means pivotally mounted on said holding member and extending therethrough for moving said sleeve relative to said first named conductor piece.

2. In a condenser, a holding member, a cylindrical dielectric piece, a conductive piece, mounted inside and at one end of said cylindrical member, and another conductor piece comprising a sleeve slidable longitudinally along the outside of said dielectric piece and movable relative to said first named conductor piece, and means for moving said sleeve comprising a shaft having bearing in said holding member, an arm connected with said shaft and engaging said sleeve, and a knob for rotating said shaft.

3. In a condenser, a supporting plate having a pair of laterally extending arms, one of said arms being insulated from said plate, a cylindrical dielectric piece secured between the ends of said arms, a conductor member secured to the insulated arm and extending in one end of said cylinder and another conductor member comprising a sleeve movably mounted on the outer surface of said cylinder and adjustable relative to said first mentioned conductor member, and manually controlled means pivotally mounted on said supporting plate intermediate said arms for adjusting said sleeve.

4. In a condenser, a holding member provided with two arms insulated from each other, a cylindrical dielectric piece secured between said arms, a conductive piece mounted inside and at one end of said cylindrical member, and another conductive piece comprising a sleeve slidable longitudinally along the outside of said dielectric piece and means carried by said holding member intermediate said arms for moving said sleeve relative to said first named conductor piece.

5. In a condenser, a holding member provided with two arms insulated from each other, a cylindrical dielectric piece secured between said arms, a conductive piece mounted inside and at one end of said cylindrical member, and another conductive piece comprising a sleeve slidable longitudinally along the outside of said dielectric piece and means for moving said sleeve, comprising a shaft having bearing in said holding member intermediate said arms and rotatable on an axis extending transversely to said cylindrical piece, an arm connected with said shaft and engaging said sleeve and a knob for rotating said shaft.

Signed at Chicago, Ill., this 14th day of April, 1925.

CLIFFORD V. BATES.